United States Patent [19]

Leydon et al.

[11] Patent Number: 5,709,942
[45] Date of Patent: Jan. 20, 1998

[54] PRODUCT AND PROCESS IMPROVEMENT OF COATED POLYMERIC MONOFILAMENT

[75] Inventors: Daniel Shawn Leydon, Cedar Knolls, N.J.; Robert Moore Marshall, Chesterfield, Va.

[73] Assignee: AlliedSignal Inc., Morristownship, N.J.

[21] Appl. No.: 698,216

[22] Filed: Aug. 14, 1996

Related U.S. Application Data

[63] Continuation of Ser. No. 702,866, May 20, 1991, abandoned.

[51] Int. Cl.$^6$ .............................. D02G 3/00; B26B 13/00; B26B 9/00
[52] U.S. Cl. .............................. 428/375; 428/378; 30/247; 30/347
[58] Field of Search .............................. 428/375, 378, 428/395; 57/258; 427/416; 8/115.6; 30/276, 347

[56] References Cited

U.S. PATENT DOCUMENTS

| | | | |
|---|---|---|---|
| 2,426,770 | 2/1947 | Grim | 260/29 |
| 4,316,325 | 2/1982 | Brucker | 30/276 |
| 4,651,422 | 3/1987 | Everts | 30/347 |
| 4,767,646 | 8/1988 | Cordova et al. | 427/387 |
| 4,800,117 | 1/1989 | Marshall | 428/260 |

FOREIGN PATENT DOCUMENTS 0220400  9/1986  European Pat. Off. .

OTHER PUBLICATIONS

J.P. Redston, W.F. Bernholz and C. Schlatter, Chemicals Used as Spin Finishes for Man–Made Fibers, Jun. 1973, vol. 43, pp. 325–335.

*Primary Examiner*—Newton Edwards
*Attorney, Agent, or Firm*—Roger H. Criss

[57] ABSTRACT

A coated monofilament comprising a polymeric monofilament and a coating of an amide melamine wax. The coated monofilament exhibits excellent lubricative and wear characteristics and can be reprocessed without adversely affecting the physical properties of the polymeric monofilament. A process for producing the said coated monofilament is also disclosed.

15 Claims, No Drawings

PRODUCT AND PROCESS IMPROVEMENT OF COATED POLYMERIC MONOFILAMENT

This application is a continuation of application Ser. No. FWC of 07/702,866 filed May 20, 1991, now abandoned.

BACKGROUND OF THE INVENTION

1. Field of the Invention

This invention relates to lubricative coating of polymeric monofilaments. More particularly, the present invention involves applying a polymeric coating finish that provides excellent lubricative characteristics to a polymeric monofilament.

2. Description of the Prior Art

Weedtrimmers of the line cutting type use flailing movement of flexible filament, which usually is made of monofilamentary polymeric material, to cut the grass or weeds. Polyamides, particularly nylon 6, nylon 6,6 and copolymers thereof, are the most typically used polymeric materials for the monofilament in such line applications.

Such a conventional weedtrimmer has a rotable driver head from which one or more of the flexible cutting filaments extends out. The rotable head contains a storage spool and metering device which feed from the spool a length of filament line as the filament line abrades away or breaks away in use. U.S. Pat. No. 4,316,325 and U.S. Pat. No. 4,651,422 describe such weedtrimmers and their parts. A conventional and most widely used mechanism to replenish the cutting filament is known as the "bump head" in the art. The mechanism allows an incremental length of the cutting filament to be replenished when tapped sharply on the ground. However, when the driver head rotates at a high speed, the centrifugal force of the flailing filament tends to tighten and knot the reserve filament on the spool. Furthermore, the filament on the spool is subject to high heat and constant vibration resulting from the high speed rotation and the constant impact upon the cutting filament outside the spool. Frequently, the heat and vibration on the spool create an environment hot and severe enough to subject the filament on the spool to be vibrationally welded together. Such knotting and welding of the filament impede the release of the reserve filament from the spool.

It is known in the weedtrimmer industry that lubricating the filament can alleviate the filament knotting and welding problems. However, utilizing a conventional lubricant may not be economically desirable. The application of conventional lubricants has been known to adversely affect the physical integrity of the filament polymer or require additional post-extrusion treatment processes. Also, it is economical and a common practice in the industry to recycle and reprocess substandard filaments since the filament manufacturing process produces amounts of substandard quality filaments that does not meet desired dimensional specifications. Consequently, it is desirable to have a coating material that will not only provide desired lubricity but will also not adversely affect the physical properties of the filament, especially when reprocessed. It is also desirable to have a lubricative coating process that does not require substantial modification of the current filament extrusion process.

There are three basic steps in the process of manufacturing the monofilament: extrusion, orientation, and relaxation. Polymer resin pellets are extruded as continuous strands of monofilament with an extruder; the resulting filaments are stretched longitudinally to orient the filament polymer in order to increase the strength of the filament; subsequently, the oriented filaments are relaxed to relieve the strain created from the orientation process. Each manufacturing step is preceded by heating and followed by cooling. Usually, heating is accomplished by passing polymeric resins or extruded strands, depending on the manufacturing step, through at least one heating oven, and cooling is accomplished by passing the strands through at least one water quench bath.

It is known in the weedtrimmer industry to employ water soluble organic and inorganic salts, such as triethanolamine, as lubricative coating materials for the weedtrimmer cutting filament. The addition of triethanolamine to the last quench bath that follows the relaxation process apparently provides satisfactory lubricity without requiring any modification of the manufacturing process. However, the filament coated with triethanolamine cannot be reprocessed since the strongly alkaline triethanolamine coating adversely interacts with the polymer of the filament during reprocessing (i.e., remelting). The adverse effect of triethanolamine creates bubbles and voids in the resulting monofilament, rendering the filament unsuitably frail.

The practice of overfinishing polymeric fiber to obtain lubricity is well known in the textile industry. However, the fiber overfinishing technology, known in the art as the spin finish or overspray, is not useful in coating the weedtrimmer cutting filaments. The spin finish lubricants, which are designed to be scourable to avoid interference with dyeing and other subsequent textile processing steps, are not suitable as polymeric monofilament coating materials since they do not form permanent coatings. A comprehensive list and characteristics of different spin finish lubricants are described in the article by Redston et al, Textile Research Journal, Vol. 43, 325–335, 1973.

The textile industry utilizes other types of finishes that are more permanent in nature although they may not be finishes to achieve lubricity. Such permanent finishes are applied to fabrics at the final stages of manufacturing in order to improve abrasion resistance, crease resistance, water repellency, and the like. In U.S. Pat. No. 2,426,770, Grim discloses a permanent water repellent and crease resistant finish that requires a heat polymerizing process. In U.S. Pat. No. 4,800,117 to Marshall (Marshall is one of the co-inventors herein), there is disclosed an abrasion resistant finish for multifilament yarns in which an melamine wax is used as one of the components of the finishing compound. The multifilament yarn finish taught in their patent also requires an additional heat polymerizing step after the finishing compound is applied to multifilament yarns.

It would be desirable to provide a coating material for monofilaments which exhibits the necessary lubricity, does not interfere in the reprocessibility of the monofilament, and does not require additional post-coating processes. It would also be desirable to provide a process for producing such monofilament, especially for use in weedtrimmers.

SUMMARY OF THE INVENTION

In accordance with this invention, there is provided a coated, flexible filament structure comprising a polymeric monofilament and a coating of an amide melamine wax. The amide melamine wax may be formed by reacting melamine with a $C_6$ to $C_{36}$, more preferably $C_{12}$ to $C_{22}$, fatty acid to form a hydrophobic amide. The resulting amide is reacted with formaldehyde, and then the polymer is emulsified. The wax is preferably applied in an amount of about 0.05 to about 1 weight percent, more preferably 0.2 to 0.8 weight percent, of the coated monofilament.

Also in accordance with this invention, there is provided a method of producing such monofilament comprising the steps of passing the monofilament in an aqueous solution of the amide melamine wax and air drying the coated monofilament. Further aspects of the invention will become more apparent from the detailed description following.

The resulting coated monofilament exhibits excellent lubricative and wear characteristics and can be reprocessed without adversely affecting the physical properties of the flexible polymeric monofilament.

DETAILED DESCRIPTION OF THE INVENTION

It has unexpectedly been found that a flexible polymeric monofilament coated with an amide melamine wax provides excellent lubricity and reprocessibility and extends the useful life of the monofilament.

As the monofilament, any of the conventional monofilament-forming polymers, including but not limited to polyamides, polyesters and polyolefins, can be employed. Among the polyamides, there may be employed homopolymers of polycaprolactam (nylon 6), polyhexamethylene adipamide (nylon 6,6), polypyrrolidone (nylon 4), polycapryllactam (nylon 8), polynonanolactam (nylon 9), polyundecanolactam (nylon 11), polydodecanolactam (nylon 12), polyhexamethylene azelaiamide (nylon 6,9), polyhexamethylene sebacamide (nylon 6,10), a polyamide of hexamethylenediamine and n-dodecanedioic acid (nylon 6,12), a polyamide of dodecamethylenediamine and n-dodecanedioic acid (nylon 12,12), and the like, as well as copolymers or mixtures thereof, such as nylon 6,6/6 copolymer. Among the polyesters, there may be employed poly (ethylene terephthalate), poly(butylene terephthalate), as well as others, and copolymers or mixtures thereof. Among the polyolefins, there may be employed high density polyethylene, low density polyethylene, polypropylene, as well as others, and copolymers or mixtures thereof. Homopolymers of nylon 6 and nylon 6,6 and copolymers thereof are the preferred polymers for the monofilament.

The amide melamine wax is preferably formed by first reacting melamine with a $C_6$ to $C_{36}$, preferably $C_{12}$ to $C_{22}$, fatty acid to form a hydrophobic amide. The amide is then reacted with formaldehyde, and the resulting resin is emulsified to form an aqueous coating emulsion of amide melamine wax. Commercially available amide melamine wax, which includes Repel-O-Tex™ 100, available from Lyndal Chemical of Dalton, Ga., may be employed in this invention. Such wax is also described in the aforementioned U.S. Pat. No. 4,800,117 to Marshall et al.

As mentioned before, there are three basic steps, extrusion, orientation and relaxation, in the process of manufacturing the monofilament, and each step is followed by one or more of water quench baths. The amide melamine wax emulsion can be added to the last quench bath of the relaxation process in a concentration which will deposit an effective amount of the wax solids on the filament when the monofilament is passed through the quench bath. Preferably, an amount of about 0.05 to about 1 weight percent of the wax solids, based on the weight of the coated monofilament, is deposited on the filament. More preferably, an amount of about 0.2% to about 0.8% is applied. After applying, the monofilament is air dried to provide sufficient cross-linking of the coated melamine wax to form a permanent coating.

It has been unexpectedly found that the resulting coated monofilament can be reprocessed along with the virgin polymer resin of the filament to produce the monofilament without adversely affecting the physical properties. Typically, substandard filaments (i.e., irregular shaped, over- or undersized filaments) are ground up or pelletized and fed to the monofilament extruder together with virgin resin. Unlike attempts to utilize reground monofilament coated with triethanolamine which is known to the art to react adversely with the polymer of the monofilament during reprocessing, as mentioned above, it has been observed that the use of the reprocessed monofilament of the present invention does not suffer the undesirable effects experienced with triethanolamine; the addition of the reprocessed monofilament of the present invention does not cause bubbles and voids in the resulting monofilament. The amount of reprocessed filament in the monofilament can vary, but preferably may range up to about 40% by weight. Furthermore, it has been unexpectedly found that the coated monofilament of the present invention has improved wear characteristics, thereby extending the useful life of the monofilament.

In order to further describe the invention, the following non-limiting examples are given. All parts are by weight unless otherwise indicated.

EXAMPLE 1

Samples of monofilament of 0.08 inch diameter extruded from Capron® 8219 nylon 6 homopolymer resin available from Allied-Signal Inc., which homopolymer has a formic acid relative viscosity of about 60 to 64 and flexural modulus of about 180,000 psi, were submerged in an aqueous amide melamine wax solution of a concentration to provide 0.2% weight percent of the wax solids on the monofilaments. The samples were then air dried at room temperature. The amide melamine wax emulsion employed was Repel-O-Tex™ 100, which is an emulsion of 25 weight percent amide melamine wax solids. Subsequently, samples of coated (Sample 1) and uncoated (Comparative Sample 1) nylon 6 monofilaments were tested for lubricity using the Twisted Strand Method of ASTM D3412-86 Yarn-to-Yarn Friction analysis. The Twisted Strand Method measures the amount of increased tension to a pretensioned monofilament when the monofilament passes across itself through a double twist at a constant speed. The results were as follows:

TABLE 1

| Sample | Yarn to Yarn Friction (grams) |
|---|---|
| Amide Melamine Wax Coated (Sample 1) | 980 |
| Uncoated Monofilament (Comparative Sample 1) | 1700–1775 |

As the above test results show, the amide melamine wax coated filaments exhibit substantially increased lubricity compared to that of uncoated filaments.

EXAMPLE 2

The monofilament coated with an amide melamine wax as specified in Example 1 (Sample 1) was tested for the tensile strength and elongation properties using a tensile test machine in accordance with the protocols of ASTM2256-88 "Standard Test Method for Tensile Properties of Yarns by the Single-Strand Method". The results are shown in Table 2.

TABLE 2

| Sample | 1 | 2 | 3 | 4 |
|---|---|---|---|---|
| COMPONENTS: (%) | | | | |
| Virgin Resin | 100 | 95 | 90 | 85 |
| Reprocessed Resin | — | 5 | 10 | 15 |
| PHYSICAL PROPERTIES: | | | | |
| Tensile Strength | | | | |
| ($\times 10^3$, psi) | 33.2 | 32.6 | 31.0 | 30.7 |
| ($\times 10^3$, Kg/cm$^2$) | 2.34 | 2.29 | 2.18 | 2.16 |
| Elongation (%) | 164 | 161 | 178 | 157 |

Sample 2

The coated monofilament of Example 1 was pelletized to approximately the size of the virgin resin of Example 1 to form a reprocessed feedstock. Monofilament was extruded from a mechanically mixed resin composition consisting of 5 parts of the reprocessed feedstock and 95 parts of the virgin resin of Example 1. The coating procedure of Example 1 was repeated, and the resulting monofilament was tested for tensile strength and elongation properties. The results are shown in Table 2.

Sample 3

The procedure of Sample 2 was repeated except that the monofilament was extruded from a mixed resin composition consisting of 10 parts of the reprocessed feedstock specified in sample 2 and 90 parts of the virgin resin of Example 1. The result is shown in Table 2.

Sample 4

The procedure of Sample 2 was repeated except that the monofilament was extruded from a mixed resin composition consisting of 15 parts of the reprocessed feedstock specified in sample 2 and 85 parts of the virgin resin of Example 1. The results are shown in Table 2.

The above test results in Table 2 show that the addition of the reprocessed feedstock to virgin nylon 6 resin did not produce any significant reduction in the physical properties of the cutting filament. Furthermore, there were no observed process difficulties experienced in using compositions comprising reprocessed feedstock, and the filaments of samples 1–4 were all readily produced.

EXAMPLE 3

The monofilament coated with an amide melamine wax as specified in Example 1 (Sample 1) was compared with a commercial weedtrimmer line (Control C1) of the same physical specifications coated with triethanolamine, which weedtrimmer line is available from Poulan/Weed Eater of Shreveport, La., for their wear characteristics, including the average feet per hour usage and the number of line breakages. A mixed growth of Bermuda and Sage grass of 6–12 inches in height was cut with a weedtrimmer manufactured by Poulan/Weed Eater, model # Husky 32L, using four 40 feet line spools of each of the two weedtrimmer monofilaments. The results are shown in Table 3.

TABLE 3

| Sample | Hours of Operation | Avg. Ft. per Hour | Line Breakage |
|---|---|---|---|
| Amide Melamine Wax Coated: | | | |
| 1 | 2.83 | 14.13 | 0 |
| 2 | 3.08 | 12.98 | 0 |
| 3 | 2.00 | 20.00 | 1 |
| 4 | 2.75 | 14.55 | 0 |
| Total | 10.66 | 15.42 | 1 |
| Control C1 Monofilament Line: | | | |
| 1 | 3.00 | 13.33 | 7 |
| 2 | 1.33 | 30.08 | 7 |
| 3 | 2.00 | 20.00 | 2 |
| 4 | 1.58 | 25.32 | 9 |
| Total | 7.91 | 20.18 | 25 |

The above results show that the weedtrimmer monofilament of the present invention coated with an amide melamine wax has superior wear and breakage resistances than the monofilament of the prior art.

It can be seen from the above examples that a flexible polymeric monofilament coated with an amide melamine wax provides excellent lubricity and reprocessibility without significant sacrifice in the physical properties. In accordance with the present invention, such flexible polymeric monofilament can be produced, without modifying the current monofilament manufacturing process used in the monofilament industry, by adding an amide melamine wax emulsion to the last water quench bath of the manufacturing process. The melamine wax coated monofilament of the present invention substantially improves wear and line breakage resistances, thereby extending the useful life of the monofilament. The coated monofilament of the present invention is particularly suitable for the weedtrimmer monofilament line applications.

What is claimed is:

1. A coated, flexible monofilament structure comprising:
   a) a reprocessed monofilament formed from a polymeric monofilament coated with an amide melamine wax; and
   b) a coating on said reprocessed monofilament, said coating comprising an amide melamine wax.

2. The coated filament structure of claim 1 wherein each of said amide melamine wax is the reaction product of reacting melamine with a $C_6$ to $C_{36}$ fatty acid followed by reaction with formaldehyde.

3. The coated filament structure of claim 2 wherein said fatty acid is a $C_{12}$ to $C_{22}$ fatty acid.

4. The coated filament structure of claim 1 wherein said coating is about 0.05% to about 1% by weight of said coated filament structure.

5. The coated filament structure of claim 4 wherein said coating is about 0.2% to about 0.8% by weight of said coated filament structure.

6. The coated filament structure of claim 1 wherein said polymeric monofilament is selected from the group consisting of polyamides, polyesters and polyolefins.

7. The coated filament structure of claim 1 wherein said polymeric monofilament comprises a polyamide.

8. The coated filament structure of claim 7 wherein said polyamide is nylon 6.

9. The coated filament structure of claim 7 wherein said polyamide is nylon 6,6.

10. The coated filament structure of claim 7 wherein said polyamide is a nylon 6,6/6 copolymer.

11. The coated filament structure of claim 1 wherein said polymeric monofilament comprises nylon 6, and said coating of an amide melamine wax is about 0.05% to about 1% by weight of said coated filament structure.

12. The coated filament structure of claim 1 wherein said polymeric monofilament comprises up to 40% by weight of reprocessed monofilament.

13. A coated, flexible monofilament structure comprising:
   a) a polymeric monofilament formed from a mixture of virgin polyamide and up to 40% by weight of reprocessed monofilament which is formed from a polyamide monofilament coated with an amide melamine wax; and
   b) a coating of an amide melamine wax covering said polymeric monofilament.

14. The coated filament of claim 13, wherein said polymeric monofilament is formed from a mixture of 85 to 95% by weight of virgin polyamide and correspondingly from 15 to 5% by weight of reprocessed monofilament.

15. The coated monofilament of claim 13 wherein said polyamide is nylon 6, said amide melamine wax is the reaction product of reacting melamine with a $C_6$ to $C_{36}$ fatty acid, followed by reaction with formaldehyde, and wherein said coating comprises about 0.05% to about 1% by weight of said coated filament structure.

* * * * *